United States Patent
Crawfis et al.

(10) Patent No.: US 7,626,591 B2
(45) Date of Patent: Dec. 1, 2009

(54) SYSTEM AND METHOD FOR ASYNCHRONOUS CONTINUOUS-LEVEL-OF-DETAIL TEXTURE MAPPING FOR LARGE-SCALE TERRAIN RENDERING

(75) Inventors: Roger Crawfis, Dublin, OH (US);
Fredrick Kuck, Columbus, OH (US);
Eric Noble, Columbus, OH (US); Eric Wagner, Columbus, OH (US)

(73) Assignee: D & S Consultants, Inc., Eatontown, NJ (US)

( * ) Notice: Subject to any disclaimer, the term of this patent is extended or adjusted under 35 U.S.C. 154(b) by 373 days.

(21) Appl. No.: 11/601,530

(22) Filed: Nov. 17, 2006

(65) Prior Publication Data

US 2007/0171234 A1    Jul. 26, 2007

Related U.S. Application Data

(60) Provisional application No. 60/761,653, filed on Jan. 24, 2006.

(51) Int. Cl.
G09G 5/00 (2006.01)
G06T 11/40 (2006.01)
G06T 17/20 (2006.01)
G06K 9/36 (2006.01)
G06K 9/54 (2006.01)

(52) U.S. Cl. .................. 345/587; 345/582; 345/423; 345/606; 345/552; 382/254; 382/274; 382/300

(58) Field of Classification Search ......... 345/418–423, 345/428, 581–587, 606, 614, 530, 545, 549, 345/552, 555, 426, 620, 613; 382/254, 274, 382/282, 285, 293, 295, 300, 305, 298–299; 358/523–525
See application file for complete search history.

(56) References Cited

U.S. PATENT DOCUMENTS 5,377,313 A    12/1994   Scheibl
5,760,783 A     6/1998   Migdal et al.

(Continued)

OTHER PUBLICATIONS

Ephanov, Anton Understanding Virtual Texture, white paper, Mar. 2006 Revision 1.0 MultiGen-Paradigm, Inc.

(Continued)

*Primary Examiner*—Wesner Sajous
(74) *Attorney, Agent, or Firm*—Fox Rothschild, LLP; Dennis M. Carleton (57) ABSTRACT

A multi-resolution texture mapping system suitable for large scale terrain rendering using commodity graphics processing units (GPU). The GPU vertex and fragment shaders are used to implement the clip-mapping functionality. The terrain texture is represented by a combination of a mip-map and a multi-level clip-map having independent origins and off-set values. The independent clip-map levels may be independently updated. The offset values allow the origins to be associated with a reference point in a scene to be rendered. The desired clip-map level to be used to render a particular fragment may be determined using the base 2 logarithm of the maximum screen-space derivative of the source texture required by the terrain geometry to be drawn. If the desired clip-map level is non-integer and lies between two clip-map levels, appropriate texel data is created by interpolating between the bounding clip-map levels. This interpolation allows a multi-resolution texture mapping to be displayed.

12 Claims, 8 Drawing Sheets

U.S. PATENT DOCUMENTS

| | | | |
|---|---|---|---|
| 6,373,482 B1* | 4/2002 | Migdel et al. | 345/419 |
| 6,417,860 B1* | 7/2002 | Migdal et al. | 345/582 |
| 6,456,288 B1 | 9/2002 | Brockway et al. | |
| 6,567,083 B1 | 5/2003 | Baum et al. | |
| 6,744,442 B1 | 6/2004 | Chan et al. | |
| 6,747,649 B1 | 6/2004 | Sanz-Pastor et al. | |
| 6,768,492 B2 | 7/2004 | Dorbie et al. | |
| 6,809,739 B2 | 10/2004 | Farinelli et al. | |
| 6,828,980 B1* | 12/2004 | Moreton et al. | 345/582 |
| 6,924,814 B1 | 8/2005 | Ephanov | |
| 7,012,614 B2 | 3/2006 | Chalfin et al. | |
| 7,034,841 B1 | 4/2006 | Weiblen et al. | |
| 2002/0038451 A1 | 3/2002 | Tanner et al. | |
| 2002/0070947 A1 | 6/2002 | Dorbie et al. | |
| 2002/0080143 A1 | 6/2002 | Morgan et al. | |
| 2002/0171644 A1* | 11/2002 | Reshetov et al. | 345/420 |
| 2003/0201995 A1 | 10/2003 | Farinelli et al. | |
| 2003/0231190 A1 | 12/2003 | Jawerth et al. | |
| 2005/0017983 A1* | 1/2005 | Liao et al. | 345/582 |
| 2005/0088450 A1* | 4/2005 | Chalfin et al. | 345/552 |
| 2005/0140678 A1* | 6/2005 | Gielis et al. | 345/441 |

OTHER PUBLICATIONS

Tanner et al., The Clipmap: A Virtual Mipmap, SGI paper, Computer Graphics Proceedings Annual Conference Series, 1998, pp. 151-158.

Silicon Graphics, Inc, IRIS Performer Real-Time 3D Rendering for High-Performance and Interactive Graphics Applications, 1998, 007-3634-001.

Lindstrom et al., Real-Time, Continuous Level of Detail Rendering of Height Fields, Proceedings of ACM SIGGRAPH 96, Aug. 1996, pp. 109-118.

Southern et al., Creation and Control of Real-time Continuous Level of Detail on Programmable Graphics Hardware, Oct. 2001, Computer Graphics Forum.

Texture mapping, available at http://en.wikipedia.org/wiki/Testure_mapping, last visited Jun. 29, 2006.

Mipmap, available at http://en.wikipedia.org/wiki/Mip_map, last visited Nov. 16, 2006.

Comparison of Direct3D and OpenGL, available at http://en.wikipedia.org/wiki/Testure_mapping, last visited Jun. 15, 2006.

OpenGL, available at http://en.wikipedia.org/wiki/Testure_mapping, last visited Jun. 15, 2006.

* cited by examiner

FIG. 1

(Prior Art)

FIG. 2A

(Prior Art)

FIG. 2B

(Prior Art)

SYSTEM AND METHOD FOR ASYNCHRONOUS CONTINUOUS-LEVEL-OF-DETAIL TEXTURE MAPPING FOR LARGE-SCALE TERRAIN RENDERING

CROSS REFERENCE TO RELATED APPLICATIONS

This application is related to, and claims priority from, U.S. Provisional Patent application No. 60/761,653 filed on Jan. 24, 2006, by Roger Crawfis, Frederic Kuck, Eric Noble and Eric Wagner titled "Asynchronous Continuous Level-of-Detail and Texture-Mapping for Large-Scale Terrain Rendering," the entire contents of which are hereby incorporated by reference.

FIELD OF THE INVENTION

The present invention relates to systems and methods of texture mapping, and particularly, to systems and methods for asynchronous, multi-resolution texture mapping suitable for large-scale terrain rendering that are capable of being implemented on, by or with standards based or commodity graphics processing units.

BACKGROUND OF THE INVENTION

Many computer graphics applications such as, for example, flight simulators, need to allow users to visualize, or fly over, terrains in real time. In order to accomplish this task, applications implement various systems, methods and processes generally known as terrain rendering.

These terrains may be represented by a combination of a geometry and a texture. The geometry is typically a triangular mesh detailing the surface of the terrain, while the texture provides the patterning or coloring appropriate to each triangle of the mesh. The texture, or texture map, for instance, may be a high-resolution satellite imagery digitized into texels. Such satellite images may, for instance, have 3 meter resolution so that the texture representing an area of 30 square kilometers may have as many as 100 million texels.

Large textures may have to be stored in a large texture database or other storage medium, which are cheaper than texture memory, but cannot be accessed as quickly by a graphics processing unit or GPU. The problem of increasing texture size, however, is further exacerbated in the case of mip-mapping, discussed in greater detail below, where multiple copies of a texture image at different resolutions are also stored. A mip-map consists of a high resolution texture pattern pre-filtered at progressively lower or coarser resolutions and stored in varying levels of detail (LOD) maps.

The process of combining, or binding, the appropriate region of the texture (which is two dimensional) to the appropriate triangle of the geometry mesh (which is three dimensional), and determining the color of the pixels to be projected onto a display device, such as a cathode ray tube (CRT) or liquid crystal diode (LCD) display screen, involves complex computation and is usually referred to as rendering, and, in the instance of terrain texture, terrain rendering. A texture is simply a two dimensional image, the size of which varies, that is applied through the process of binding to a three dimensional object to simulate its surface. Once the texture is applied to the three dimensional object, the object appears as though the texture has been "painted" on it.

Modern graphic computer workstations typically only allow the rendering and display of a few thousand textured triangles at real-time interactive rates. A major challenge for a real-time, geo-specific terrain rendering system involving a workstation computer with a "commodity" GPU, therefore, is dealing with the large amount of data that must be processed to cover a large terrain expanse using a texture that is based on high-resolution satellite imagery. Moreover, further exacerbating this challenge, the rendering architecture of the workstation computer must be able to utilize the graphics capabilities of the workstation in a way that allow real time rendering of geo-specific terrain in the most life-like way, i.e., with as few artifacts as possible, without interruption, and without overtaxing computer system resources.

A background of terrain rendering is now presented.

Figure 1:
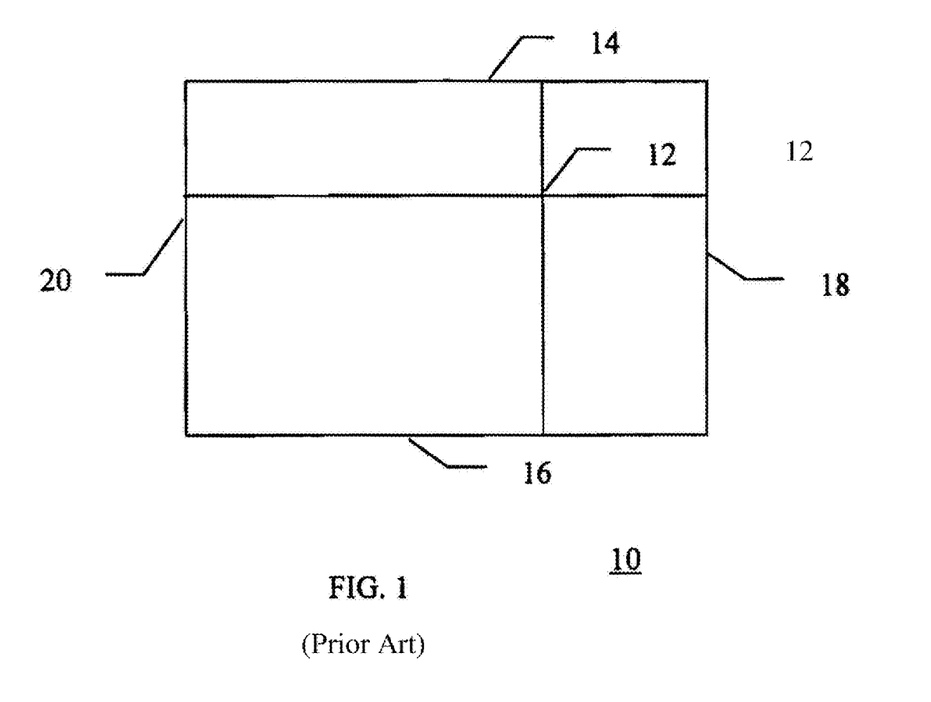
FIG. 1 is a plane view of a toroidal map.

FIG. 1 is a schematic representation of a toroidal texture map 10 having an origin 12. The toroidal texture map 10 is called toroidal because edge 14 rolls over to edge 16, i.e., as the origin 12 is moved, the texels that are removed at edge 14 reappear at edge 16. Similarly edge 18 rolls over to edge 20. If the texture map 10 is visualized as having edges 14 and 16, and edges 18 and 20 joined, it forms a torus or toroid, hence the nomenclature.

A significant amount of the image processing required when using a high resolution texture in an interactive or real-time graphics display results from the fact that a single pixel of the display typically covers many texels of the high resolution texture.

Figure 2A:
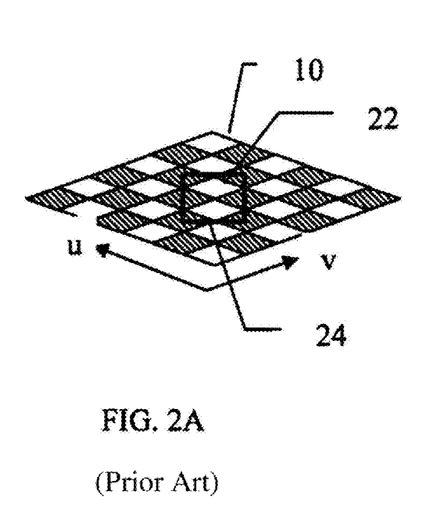
FIG. 2A is a view of a texture in pixel space.
Figure 2B:
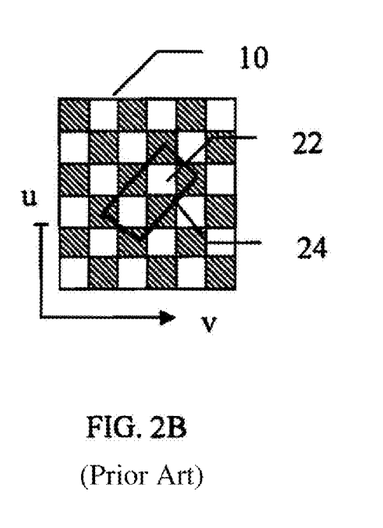
FIG. 2B is a view of a texture in texel space.

FIG. 2A is a view of a portion of the toroidal texture map 10 in pixel space. This is the view of the texture as seen on the graphics display device, such as a computer monitor or other display, and the pixel 24 is square. FIG. 2B shows a view of the toroidal texture map 10 in texel space. A display pixel 24 is projected back onto the toroidal texture map 10 and covers several texels 22. To obtain the correct or most graphically accurate color to display on the display pixel 24, the effect of all the texels 22 influencing the pixel 24 should be integrated. It is, however, difficult to determine the precise influence of all the texels 22 near a particular pixel 24, and it is effectively computationally impossible to do so perfectly in real time. Simple filtering techniques, such as picking the texel 22 at the center of the pixel 24, usually result in severe aliasing of the image, i.e., the sampling causes artifacts such as, but not limited to, straight lines or edges becoming broken or jagged. Solving the problem of obtaining the correct pixel color to display is, therefore, often referred to as anti-aliasing the texture, of which there are known methods within the art.

A popular texture anti-aliasing method is "mip-mapping." ("mip" stands for "multum in parvo," which is Latin for "many things in a small space"—in this case, many texels ("many things") projected to lie within a pixel ("small place") of the display device). In mip-mapping, the high resolution texture is pre-filtered into a pyramid of smaller textures, or levels, each representing the texture at a lower resolution. As the pre-filtering is only done once off-line, more sophisticated, computationally expensive techniques can be used. These techniques include, but are not limited to, Gaussian, Lanczos or Kaiser filtering, with appropriate gamma correction to adjust the brightness of the texels.

The mip-map of a required region of the texture includes well corrected mip-map levels at a range of resolutions. In order to render a given fragment of a geometry, the rendering system first determines which of the mip-map levels is filtered to the appropriate resolution, i.e., which of the mip-map levels has texels that, given the required geometry, will come closest to appearing as a single pixel on the display screen. Such an approach is usually termed a multiple static Level-of-Detail (SLOD) solution.

In a typical real time terrain rendering application, such as an aircraft flight simulation, the observer typically views the terrain at an oblique angle. The nearby terrain is, therefore, seen at a significantly higher resolution than the distant terrain, near the horizon. Using a SLOD solution, a displayed image will have a number of steps as the system switches from using texels from one mip-map level to another mip-map level. These steps need to be blurred out using alpha-blending or some other smoothing effect.

Implementing a large texture mip-map requires a significant amount of memory. One way to reduce the memory requirement, however, is to use a "clip-map." A clip-map is a partial mip-map in which each level has been clipped to a specified size. Clip-maps have been described in, for instance, U.S. Pat. No. 7,012,614 entitled "Texture Roaming via Dimension Elevation" issued to Chalfin, et al., on Mar. 14, 2006, the contents of which are hereby incorporated by reference, and Christopher C. Tanner, et al., *The Clipmap: A Virtual Mipmap*, SGI paper, Computer Graphics Proceedings Annual Conference Series, 1998, pp 151-158, the contents of which are also hereby incorporated by reference. The clip-map representing a subset of the complete mip-map may be transferred to, and stored in, graphics (texture) memory where it may be accessed more quickly than from the data-base or other storage. The standard full size mip-map may be stored in a database on a disk or other less expensive storage area.

Figure 3:
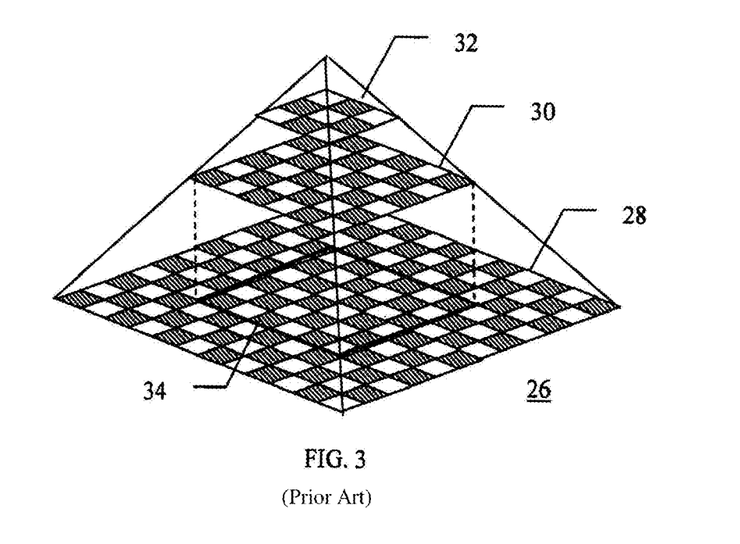
FIG. 3 is an isometric view of a combined clip-map and mip-map.

FIG. 3 is an isometric view of a combined mip-map and clip-map 26. The mip-map of FIG. 3 has a mip-map level(0) 32. The clip-map portion of FIG. 3 has a clip-map level(0) 30 and a clip-map level(1) 34. The clip-map level(1) 34 is the mip-map level (2) 28 clipped to be the same size as clip-map level(0) 30. It should be noted that this labeling of levels used in this specification is in contrast to the labeling of levels used in OpenGL and common computer graphics in which the numbering for mip-maps typically has zero as the highest resolution and higher numbers for lower resolutions. The labeling of levels as described in this specification has the advantage of dealing or working more easily with texture libraries growing by the addition of higher resolution imagery.

Generally, the texel data in each level of the combined mip-map and clip-map 26 is referred to as a "tile," which is further comprised of a collection of "sub-tiles," thereby resulting in a "texture mosaic" at each such mip-map or clip-map level. As such, the combined mip-map and clip-map 26 can be thought of as a texture mosaic or set of sub-tiles made up of texel data corresponding to a source texture image filtered at different resolutions and clipped at a specified clip size.

Figure 4A:
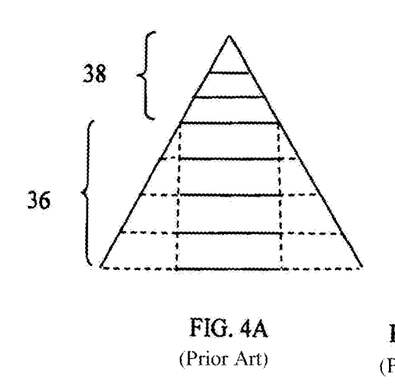
FIG. 4A is a 1D representation of an exemplary, combined clip-map and mip-map.
Figure 4B:
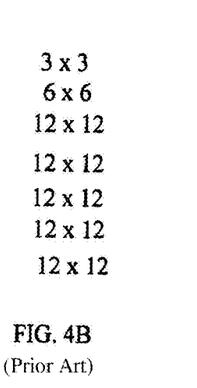
FIG. 4B is a table listing the number of pixels in an exemplary, combined clip-map and mip-map.
Figure 4C:
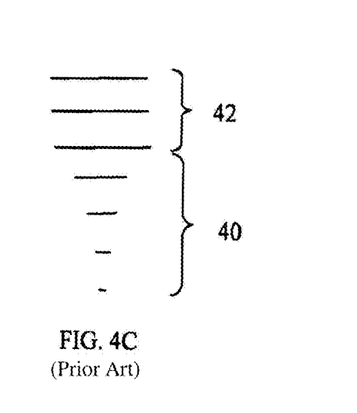
FIG. 4C is a 1D representation of the region of real space covered by each level of an exemplary, combined clip-map and mip-map.

FIG. 4A is a one dimensional representation of an exemplary combined mip-map and clip-map 26. In this example, the mip-map 38 has three levels. As seen from FIG. 4B, mip-map level 0 is a 3-by-3 array of pixels, mip-map level 1 is a 6-by-6 array of pixels and mip-map level 2 is a 12-by-12 array of pixels. The clip-map 36 has 5 levels, each of which is a 12-by-12 array of pixels. FIG. 4C is a one dimensional representation of the region of real space covered by each level of the combined clip-map and mip-map 26.

Each level of the mip-map region 42 of the combined mip-map and clip-map 26 covers the same extent of real space, but with each increasing level having a progressively higher resolution, and therefore, requiring more pixels to represent the region. Each increasing level of the clip-map region 40, in contrast, covers a progressively smaller extent of real space, but each at a progressively higher resolution, so that a constant number of pixels is required for all the levels of the clip-map region 40.

For terrain rendering applications supported by clip-mapping, texel data is drawn from an appropriate level of detail within a clip-map cached in either main or graphics (texture) memory. The clip-map is centered about a clip center, which can be an arbitrary texture space coordinate that defines the center of each clip map level. Often the clip center is associated with an eye point in a graphical application. In this way, texture at the finest resolution can be provided near an eye point and coarse texture can be drawn from levels further away from the eye point.

As the user flies over the terrain in a flight simulation application, and the eye-point of a geo-specific terrain rendering system changes, the clip-map levels cached in main and/or graphics memory will require updating from the database. The updating may be done by loading into memory the applicable clip-map terrain imagery in small blocks of texels previously referred to herein as sub-tiles. As noted, each level or tile of the texture is sometimes referred to as a mosaic texture because it is composed of a collection of such sub-tiles. The updating may be performed using toroidal addressing of the sub-tiles of each level of the clip-map. Toroidal addressing is described at length in the article, Christopher C. Tanner, et al., *The Clipmap: A Virtual Mipmap*, SGI paper, Computer Graphics Proceedings Annual Conference Series, 1998.

Although clip-mapping has advantages, its use to date has been limited to specialized hardware designed to support clip-mapping, such as the InfiniteReality Machine graphics hardware available from SGI, a Delaware Corporation, or to methods such as the "extra-dimension clip-map," as described in U.S. Pat. No. 7,012,614. Significantly, in both of these implementations of clip-mapping, all levels of the clip-map are updated simultaneously, which is wasteful of transfer bandwidth between the data-base containing the complete texture data-base and main system and graphics memory. Synchronous transfer of all clip-map levels, required in both of these prior implementations of clip-mapping, is also an inefficient use of graphics memory.

What is needed, therefore, is a system and method to implement clip-mapping using standard or commodity graphics hardware and in a way that makes efficient use of transfer bandwidth between a database storing the complete mip-map and the graphics (texture) memory of the graphics hardware.

SUMMARY OF THE INVENTION

Briefly described, the invention provides a system and method for multi-resolution texture mapping designed to be suitable for large scale terrain rendering systems. In a preferred embodiment, the present invention enables standards based, or commodity, GPUs or graphics hardware to implement extended clip-mapping functionality. The present invention extends prior clip-map approaches previously described by allowing, among other things, independent updating of each clip-map level. "Commodity" graphics hardware or "commodity" GPU refer to a GPU, graphics hardware or graphics hardware system, such as a graphics card, that are readily available commercially and are not of custom design and are capable of supporting the OpenGL Shading Language (GLSL) or equivalent functionality in Microsoft's High Level Shading Language (HLSL) and/or DirectX 8.0 or higher. A commodity GPU, which may be incorporated into a graphics card, or other commodity graphics hardware, typically includes or is coupled to dedicated random access memory (RAM) memory, known synonymously as graphics, video or texture memory (hereinafter, "graphics memory"), which can store multi-dimensional texture.

In a preferred embodiment, the source texture is represented in a computer workstation's main memory by both a mip-map and a clip-map having two or more clip-levels. The source texture stored in main memory is transferred from storage, such as a disk (hard drive) or other source, which may be remote from the workstation, such as, for instance, over a network.

Both the mip-map and the clip-map contain texel data that represents the source texture. Each clip-map level is a fixed size, toroidal map, comprised of sub-tiles, having a predetermined number of texels and representing the source at a particular level of detail. In addition, each clip-map level has its own origin and its own off-set value that allows the origin to be associated with a reference point in a scene to be rendered.

The desired clip-map level to be used to render a particular fragment of a scene is determined using screen-space derivatives. In particular, the desired clip-map level is obtained by calculating the base 2 logarithm of the maximum screen-space derivative of the source texture as currently displayed. This may be done using, for instance, the dFdx and the dFdy functionality of a fragment shader (also known as a pixel shader) of a GPU capable of supporting the OpenGL Shading Language (GLSL).

If the desired clip-map level is non-integer and lies between two clip-map levels, appropriate texel data is created by interpolating between the bounding clip-map levels. This interpolation allows a continuous level of detail for the texture mapping. This interpolation may, for instance, be implemented using the functionality of a fragment (pixel) shader.

Each clip-map level or tile in a preferred embodiment is an independent toroidal map having its own origin and off-set to the origin. Interpolation between two levels, therefore, requires independently mapping the origin of each level to a current position of interest. Rather than doing this mapping for each fragment, a texture coordinate generator is used to transform, or map, the current coordinates of interest to the toroidal map representing each clip-map level. The texture coordinate generator may be implemented, for instance, by using a planar mapping or a texture matrix. These texture coordinate generators may, for instance, be realized by using the functionality of a vertex shader of a GPU. Vertex and pixel (fragment) shaders and vertex and pixel processors are discussed in greater detail below.

The advantages of extending the clip-map concept to include independent clip-map levels include, but are not limited to, allowing each clip-map level to be updated independently and asynchronously, an advantageous feature not realized in prior implementations of clip-mapping, such as SGI's InfiniteReality Machine graphics hardware or methods such as the "extra-dimension clip-map," as described in U.S. Pat. No. 7,012,614. The highest resolution clip-map level may, for instance, be updated by importing texture sub-tiles from a texture data-base into a main or graphics memory on one schedule, such as, but not limited to, every second frame or data cycle. The next highest resolution clip-map level may, however, be updated on a different schedule such as, but not limited to, every fourth frame or data cycle.

These and other features of the invention will be more fully understood by references to the following drawings.

DETAILED DESCRIPTION

The present invention applies to systems and methods of graphics rendering, and particularly to systems and methods for real-time rendering of large, geo-specific terrains using standards based, or commodity, GPUs, graphics hardware and/or graphics hardware systems.

In a preferred embodiment, the present invention leverages the vertex and fragment processors and the vertex and fragment shaders that are now standard components of many commodity GPUs to implement an extended version of clip-mapping. Vertex shaders are programmable modules capable of modifying values associated with each vertex of a graphics geometry. Fragment or pixel shaders are programmable modules capable of modifying values on a per pixel basis. The extended clip-mapping of the present invention includes allowing asynchronous updating of the different clip-map levels. Whereas with prior clip-map technology, such as SGI's InfiniteReality Machine, the clip-maps of each clip-map level all have a common origin, with the present invention, the clip-maps of each clip-map level are all of independent origin, thereby making updating more efficient. In addition, with the present invention, the pixel (fragment) shaders may be programmed to provide multi-resolution rendering using tri-linear interpolation between clip-map levels.

By way of background, with the advent of the DirectX 8.0 API and similar functionality in OpenGL, GPUs added programmable shading to their capabilities by way of a vertex processor and a pixel (fragment) processor. Each pixel could now be processed by a short program (a pixel shader) that could include additional image textures as inputs, and each geometric vertex could likewise be processed by a short program (a vertex shader) before it was projected onto the display device.

A pixel processor is a component on the GPU devoted exclusively to pixel shader programs. A pixel or fragment shader is a processing function that processes pixels (manipulates fragment data) and executes on the pixel processor of the GPU. These processing units only perform calculations regarding pixels. Because pixels represent color values, pixel shaders are used for all sorts of impressive graphical effects. Pixel or fragment shaders create ambiance with materials and surfaces that mimic reality.

Similar to pixel or fragment processors, vertex processors are components on the GPU designed to process shaders that affect vertices. A vertex shader is a graphics processing function, which manipulates vertex data values on an X (length), Y (height) and Z (depth) three dimensional plane through mathematical operations on an object. Since more vertices means more complex three dimensional objects, vertex shaders are important in three dimensional scenes with many complex three dimensional objects. Vertex shaders provide a way to modify values associated with each polygon's vertex, such as its color, normal, texture coordinates, and position. This functionality was first introduced with DirectX 8.0 and is also available in OpenGL version 2.0.

In a preferred embodiment, the terrain rendering architecture of this invention includes a number of useful features. The texture paging or loading is centered around the viewer's gaze, or the eye-point. The texture is represented in toroidal mapping in order to reduce the number of texel updates that need to be performed when the eye-point, camera or point of view moves, as only the newly revealed texture texels need to be loaded. The texture is loaded into the GPU as independent clip-map texture levels, each having independent centers and coordinates.

The GPU's vertex shaders are programmed to determine the texture coordinates of each toroidally mapped texture level, thereby enabling each clip-map level to be independent of the other clip-map levels. The GPU's fragment shaders are programmed to determine the clip-map level required for each pixel and to provide tri-liner interpolation when the desired clip-map level falls between the available clip-map levels, thereby providing a texture rendering that has a multi-resolution detail. Multi-resolution texture is sometimes referred to as continuous-level-of-detail (CLOD) texture, though the term CLOD is usually used only to refer to geometry and not to texture.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 5:
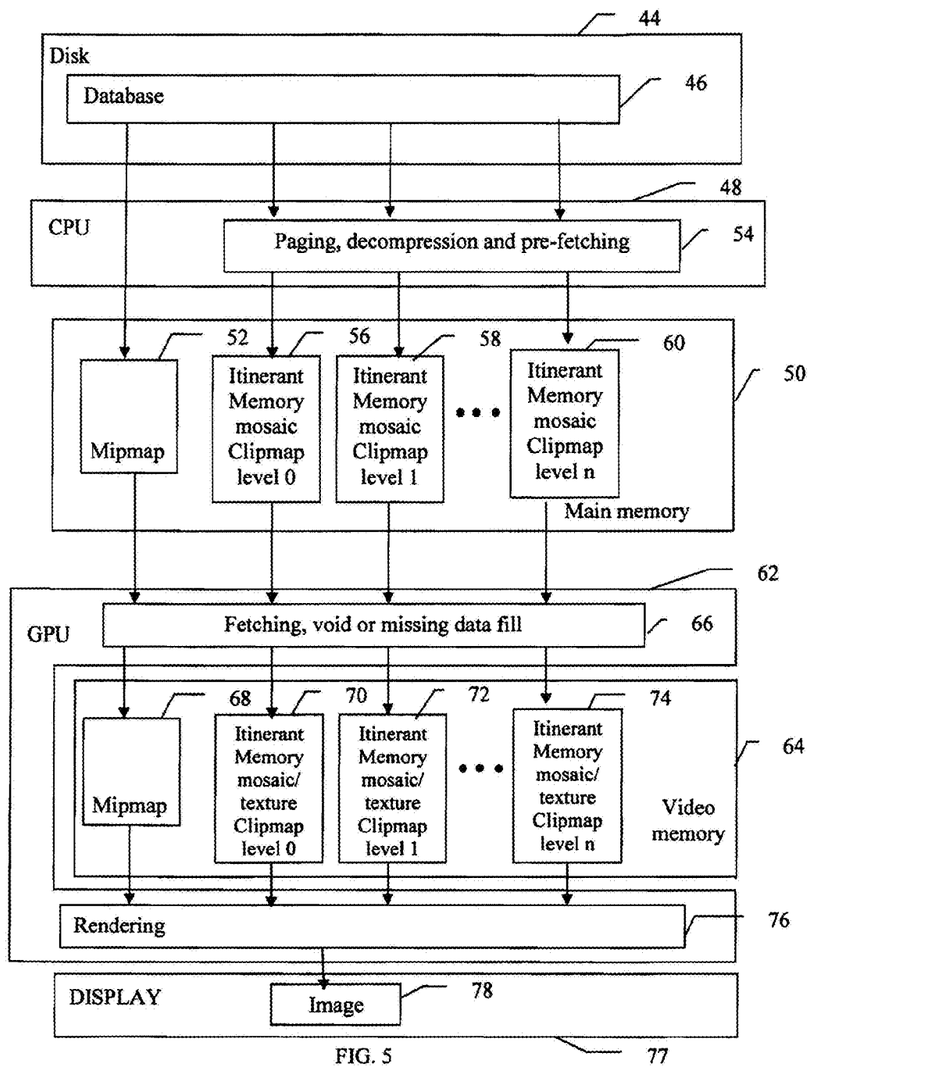
FIG. 5 is a schematic representation of an asynchronous multi-resolution texture mapping system in accordance with one embodiment of the present invention.

FIG. 5 is a schematic representation of an asynchronous, multi-resolution texture mapping system in accordance with one embodiment of the present invention. The system comprises a disk (storage) 44, a computer processing unit (CPU) 48, a graphics processing unit (GPU) 62 and a display 77.

The disk 44 contains a database 46 that may be remote from both the CPU 48 and the GPU 62, such as, for instance, over a network. The database 46 contains the complete high resolution texture and the pre-computed lower resolutions levels that may form both the mip-map 38 and the clip-map 36 levels of the combined mip-map and clip-map 26 for all regions of the terrain.

The CPU 48 comprises a paging, decompression and pre-fetching module 54 and is associated with a main or system (host) memory 50.

The GPU 62 comprises a fetching and void or missing data fill module 66 and a rendering module 76 and is associated with its own graphics (video) or texture memory 64.

The main memory 50 may be organized, in part, as comprising a mip-map region 52, an itinerant memory mosaic region 56 containing the level 0 texture clip-map, an itinerant memory mosaic region 58 containing the level 1 texture clip-map and an itinerant memory mosaic region 60 containing the level n texture clip-map.

The graphics memory 64 may similarly be organized as comprising a mip-map region 68, an itinerant memory mosaic region 70 containing the level 0 texture clip-map, an itinerant memory mosaic region 72 containing the level 1 texture clip-map and an itinerant memory mosaic region 74 containing the level n texture clip-map. In practice, the main memory 50 clip-map size is generally much larger than the graphics memory 64 clip-map size. The main memory 50 may therefore be a staging cache for the GPU. In an alternative embodiment, the system of this invention may also be implemented using the main memory 50 as a pure cache.

The mip-map, and each level of the clip-map, may be loaded into the graphics memory 64 using parallel threads running on the paging, decompression and pre-fetching module 54 and the fetching and void or missing data fill module 66.

A typical consumer or commodity GPU has a graphics memory 64 of between 32 MB to 1024 MB. In addition to storing the textures, the graphics memory 64 is also used to store the frame buffer, the depth buffer, geometry and other graphics states. The texture size on a typical commodity GPU 62 is currently limited to textures of at most 4096 by 4096 texels. The resolution of the display 77 is typically 1280 by 1024.

Figure 6:
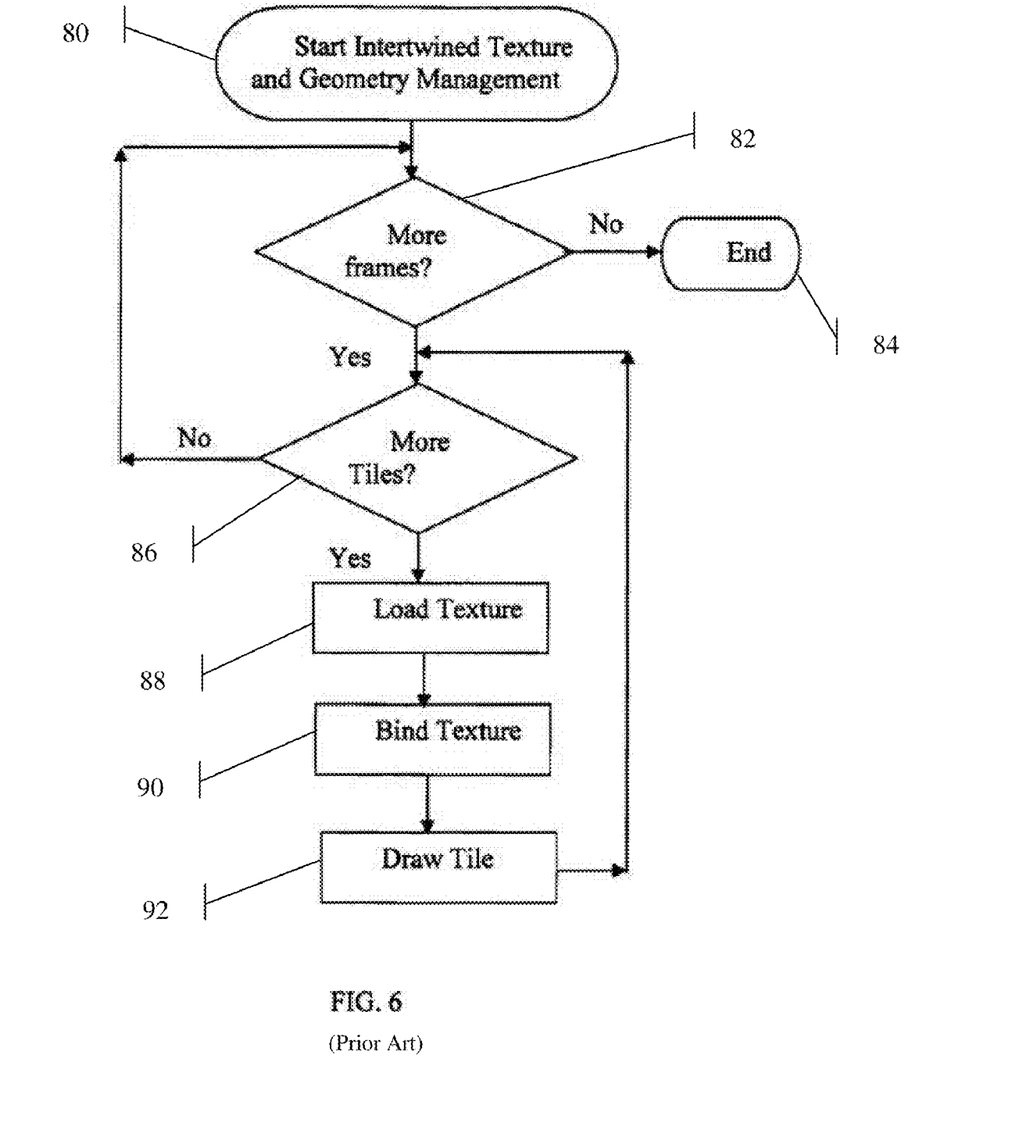
FIG. 6 is a flow chart showing representative steps in a work flow of a conventional terrain rendering system that intertwines geometry management and texture management.

FIG. 6 is a flow chart showing representative steps in a work flow of a conventional terrain rendering system that intertwines geometry management and texture management. The geometry, which is typically a triangular mesh detailing the terrain surface, is typically divided into groups of triangles that are dealt with as units. These groups of triangles are typically referred to as geometry tiles. The approach outlined in the flow chart of FIG. 6 is commonly used on consumer or commodity GPUs and requires that new texture data is loaded for each geometry tile during the rendering process. In this method, the textures change many times in the course of rendering a single frame, which can be computationally expensive, as described in detail below. This architecture is necessitated due to the fact that computer graphics hardware textures have severe limitations. Under the conventional terrain rendering system of FIG. 6, it therefore requires many textures to cover a large terrain and its associated imagery. More importantly, processing or rendering large numbers of textures limits the amount of geometry (triangles) that can be processed by the GPU at one time, hence forth termed a graphics batch, since only one of these textures can be applied at a time.

In step 80 the intertwined texture and geometry management process is started. In step 82, a process such as the paging, decompression and pre-fetching module 54 running on the CPU 48, determines whether the application requires more video frames to be rendered. If the application does not require the rendering of additional frames, the process ends in step 84.

If more frames require rendering, the process determines in step 86 whether the geometry of the current frame to be rendered requires more geometry tiles to be rendered. If no additional geometry tiles remain or are required to be rendered in the current frame, the process loops back to step 82 to determine whether more frames need to be rendered. If more geometry tiles are to be rendered, the process first loads the texture for the geometry tile in step 88, then binds the texture to the geometry tile in step 90 and renders or "draws" the geometry tile and its texture which is projected onto the graphics display in step 92. As such, geometry and texture are rendered simultaneously and only after the texture is bound to the geometry to be rendered. This intertwined texture and geometry management system is inefficient and not suitable for high resolution, geo-specific terrain rendering on a standard workstation computer.

A further shortcoming of the intertwined texture and geometry management system is that if there is any delay in loading the texture in step 88, the process ceases to render the image in real time.

Figure 7:
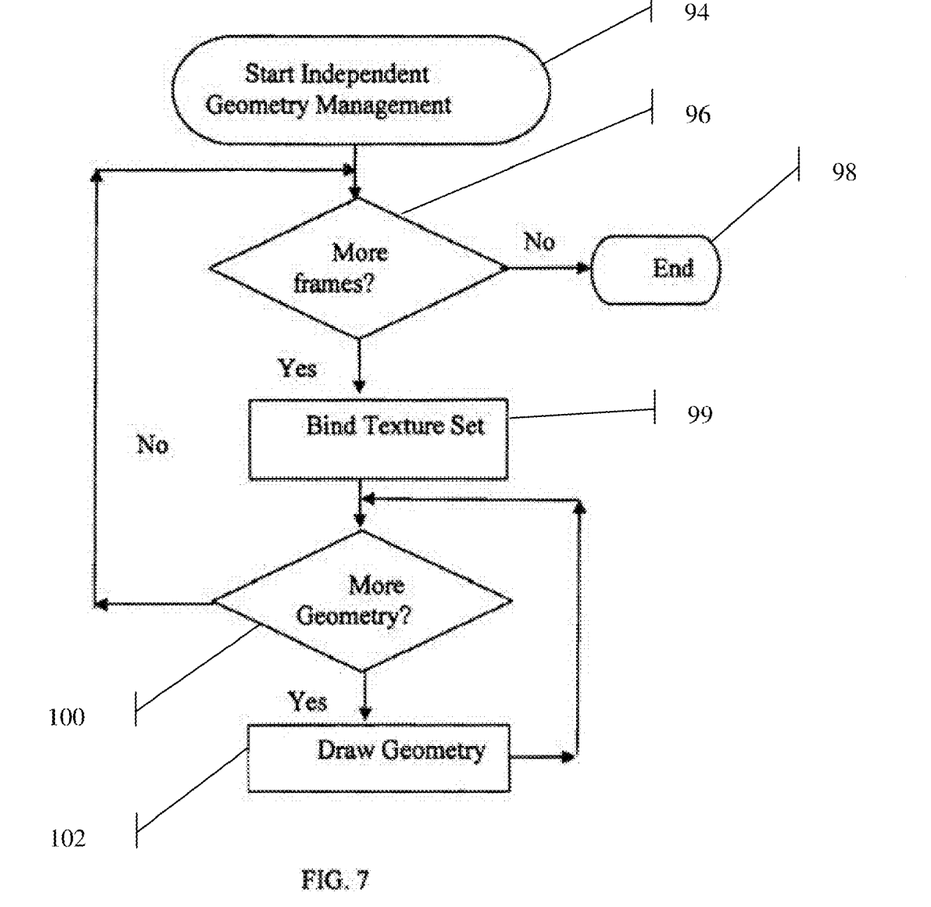
FIG. 7 is a flow chart showing representative steps in an independent geometry management in accordance with one embodiment of the present invention.
Figure 8:
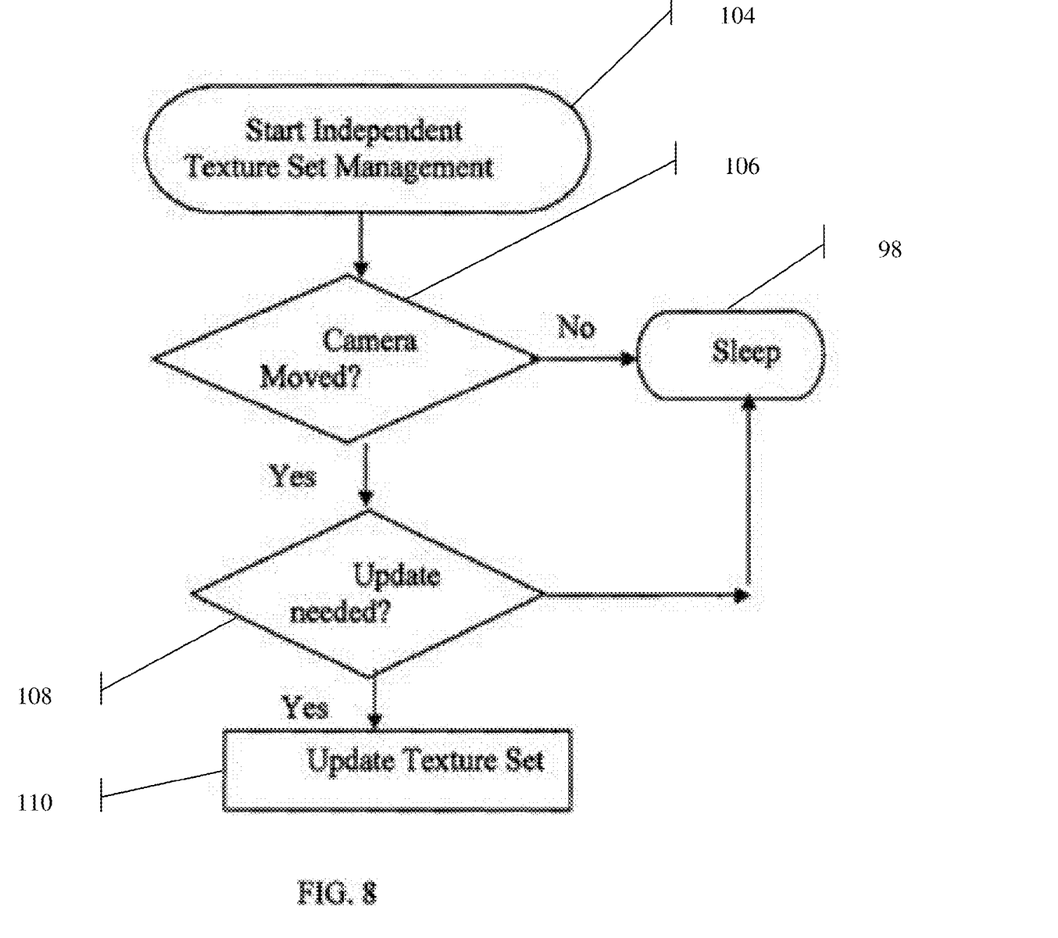
FIG. 8 is a flow chart showing representative steps in an independent texture set management in accordance with one embodiment of the present invention.

An alternative system, employed in a preferred embodiment of the present system, implements separate independent geometry management and independent texture management and is detailed in flow charts of FIG. 7 and FIG. 8. In this system, the geometry updating and texture updating are performed separately. The texture-set, i.e., the set of mip-map and clip map levels representing the terrain texture, is updated periodically as the camera or point of view moves with regard to the terrain scenery. The updated texture-set is then loaded once per frame. However, the texture updating may run at a much slower cycle, such as once every n frames (e.g., once every 10-60 frames at 60 frames per second), and may be asynchronous with respect to the rendering, as described in detail below.

In step 94, a process running on the CPU 50 and the GPU 62, such as the rendering module 76, starts running a geometry management thread. In step 96, this process determines if an application requires any more frames to be rendered. If the application does not require any additional frames to be rendered, the process ends in step 98.

If additional frames are to be rendered, the process binds the texture-set in step 99. Binding a texture, or texture-set, is the process of making a texture, or texture-set, the active texture for the rasterization process. In a GPU that conforms to the OpenGL standard, there are from two to sixteen texture processing units. Making a texture active assigns the texture to one of these texture processing units. Once the texture set is bound to the GPU, the process moves on to step 100 to begin drawing the geometry tiles and those tiles' associated texture into a frame buffer. The drawn geometry is what will be projected onto the display and seen as the video frame.

In step 100, the rendering process determines whether additional geometry tiles are required, i.e., whether additional geometry requires rendering. If no additional geometry tiles are required to be drawn, the process loops back to step 96 to determine whether additional frames are to be drawn. However, if additional geometry tiles are required, the process draws or renders those geometry tiles into the frame buffer in step 102.

At the same time, another process running on the CPU 50 and the GPU 62, such as the fetching and void or missing data fill module 66, starts an independent texture set management thread in step 104.

In step 106 of the independent texture set management thread, the process determines whether the camera or point of view of the scenery has moved or changed. If the camera or viewpoint has not moved or changed, the independent texture set management thread goes to sleep in step 98. If the camera or viewpoint has moved or changed, the independent texture set management thread determines whether an update is required for any of the texture sets, i.e., to any of the clip-map levels or mip-map levels associated with the terrain currently being displayed.

If no update is required for the currently displayed texture set, the thread goes to sleep in step 98. However, if an update is required for the displayed texture set, the thread initiates a texture set update, which is described in more detail below with reference to FIG. 10.

Figure 9:
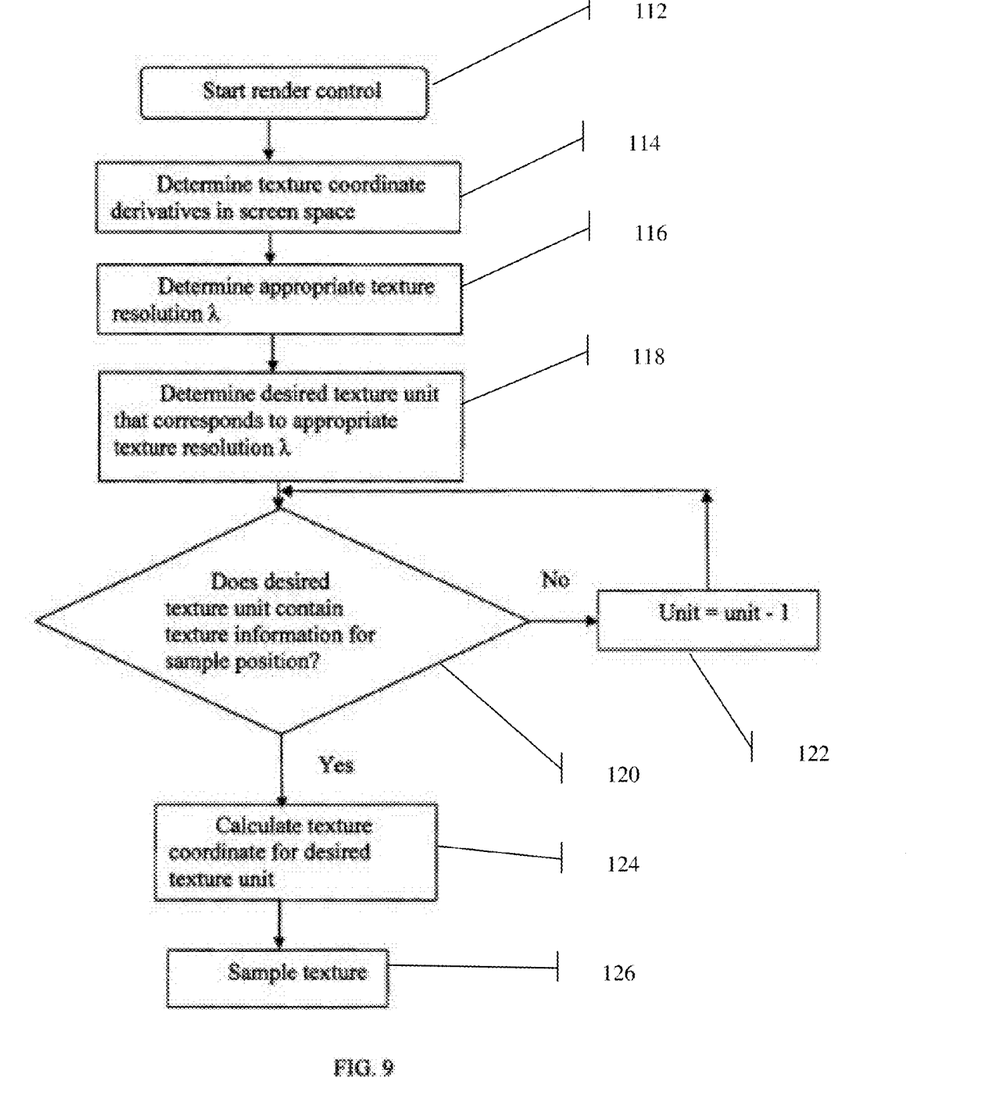
FIG. 9 is a flow chart showing representative steps in a render control in accordance with one embodiment of the present invention.

FIG. 9 is a flow chart showing representative steps in a render control in accordance with one embodiment of the present invention.

In step 112 of the render control, a module such as the rendering module 76 on the GPU 62 starts a render control thread.

In step 114, the render control thread determines the texture coordinate derivatives in screen space, i.e., the thread determines the rate of change of the texture coordinates in screen space. This may be done using, for instance, the dFdx and the dFdy functionality of the fragment shader of a GPU capable of supporting the OpenGL Shading Language (GLSL) or equivalent functionality in Microsoft's High Level Shading Language (HLSL). HLSL is designed to integrate with Microsoft's DirectX 8.0 and 9.0 collection of graphics application programming interfaces (APIs). The texture coordinate derivatives are, effectively, the number of texture texels, including fractions of a texel, which contribute to the color of a display pixel at the level of detail required by the terrain geometry. As can be seen from FIG. 2B, the number of texels that contribute to the color of a pixel may differ significantly in the x and the y directions. Typically, the maximum value is used.

In step 116, the render control thread uses the texture coordinate derivatives to determine a desired texture resolution $\lambda$. For a smaller change in texture coordinates, a higher resolution texture image is required. This step is similar to determining the appropriate mip-map or clip-map level.

In a preferred embodiment of the invention, the appropriate texture resolution may be found using the formula:

$$\lambda = -\log_2(N) - \log_2(\max(|du/dx|, |du/dy|, |dv/dx|, |dv/dy|))$$

where $\lambda$ represents the highest resolution texture unit required, given a highest resolution texture of N by N texels, and where the lowest level mip-map is designated the level 0 mip-map having 1 texel. The texel coordinates are u and v and the pixel coordinates are x and y.

In step 118, the render control thread determines which level of either the desired mip-map or the clip-map level is the one that corresponds to the highest resolution texture unit $\lambda$.

In step 120, the render control thread determines whether the desired texture level contains texture information for the sample position. If the desired texture level does not contain texture data for the sample position, in step 122 the thread drops down to the next highest resolution level of either the clip-map or the mip-map as being the new desired texture level and re-determines as to whether the new texture level contains texture data for the sample point. If the new desired texture level does not contain texture data for the sample position, the process repeats itself in step 122 until the texture data for the sample point is obtained from the texture level.

If the desired texture unit contains texture data for the sample point, the thread goes to step 124 and calculates the texture coordinate. This step is necessary because the different texture levels have independent centers, so that the texture coordinates must be recalculated when mapping texture from on texture level to another.

In step 126, the thread then samples the texture and calculates the required value of the pixel.

Figure 10:
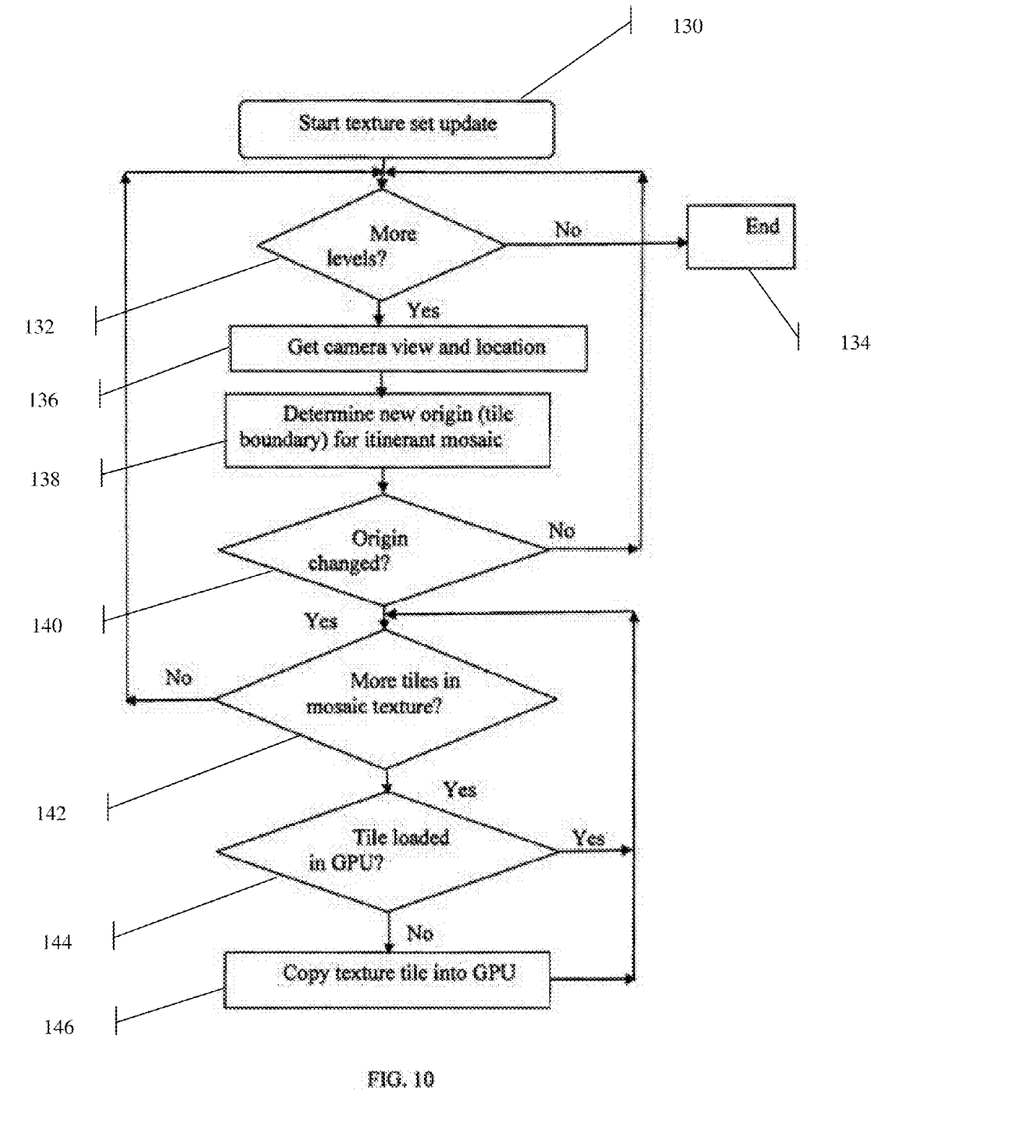
FIG. 10 is a flow chart showing representative steps in a texture set update in accordance with one embodiment of the present invention.

FIG. 10 is a flow chart showing representative steps in a texture set update in accordance with one embodiment of the present invention. In step 130, a module of the CPU such as the fetching and void or missing data fill module 66 initiates a texture set update thread.

In step 132, the texture set update thread determines whether any additional texture clip-map or mip-map levels require updating. If no additional clip-map or mip-map levels need to be updated, the thread ends the updating in step 134.

If more clip-map and/or mip-map levels require updating, the texture set update thread first obtains details of the camera or point of view and the location in step 136. Data as to camera point of view and location is then used in step 138 to determine a new origin, or tile boundary, for that texture clip-map or mip-map level. In step 140, the texture set update thread determines whether the origin of the current texture level has changed from what was previously stored in the GPU or graphics memory. If the current origin has not changed, the thread loops back to step 132.

If the origin of the current texture level has changed, the texture update thread proceeds to step 142 and determines whether there are more texture sub-tiles needed to complete the current texture clip-map or mip-map level, which may be referred to as the current mosaic texture. If no further texture sub-tiles are required, the thread loops back to step 132. If more sub-tiles are required, the texture set update thread determines in step 144 whether the required sub-tile has already been loaded into the GPU. If the required texture sub-tile has already been loaded into the GPU, the thread loops back to step 142. If the required sub-tile has not been loaded into the GPU, the thread loads the required texture sub-tile into the GPU's graphic memory 64 in step 146 by copying it from main or system memory 50 or from the database. The texture set update thread then loops back to step 142.

As detailed above, the rendering process of this invention includes performing a multi-resolution texture mapping. This includes storing a texture mip-map that uses texel data to represent a source texture in a memory, as well as storing a texture clip-map in that memory. The clip-map includes at least one clip-map level having texel data. If more clip-map levels are present, each level represents the next higher level of detail of the source texture and each has an origin and an offset value that associates the offset value with a reference point of a scene to be rendered. The rendering process determines a desired level clip-map for a fragment of a texture image, and, if the desired level is between two level clip maps, the process creates texel data by interpolating texel data from the two clip map levels.

In a further embodiment of the invention, an additional texture may be used to indicate which texture sub-tiles have valid data. This may, for instance, be done using a grid of spatial locations indicating a level at which a valid sub-tile is currently available in GPU memory 64. In this way the system may support the ability to function with small missing sub-regions of the texel data.

In yet a further embodiment of the invention, the system may support non-RGB reconstruction of textures. In one embodiment, the textures may be compressed using, for instance, well known wavelets compression technology. The texture reconstruction may then be done using appropriately programmed fragment or vertex shaders.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. A method, executed in a computer having a computer-readable memory, for continuous-level-of-detail texture mapping, comprising the steps of:
    storing a texture mip-map in said computer-readable memory, said mip-map comprising texel data representing a source texture;
    storing a texture clip-map in said computer-readable memory, said clip-map comprising a first-level clip-map having texel data representing a first level of detail of said source texture, a first origin and a first offset value associating said first offset value with a reference point of a scene to be rendered, and a second-level clip-map having texel data representing a second level of detail of said source texture, a second origin and a second offset value associating said second offset value with said reference point; and
    determining a desired level clip-map for a fragment of a texture image, and, if said desired level is between said first and second level clip maps, creating texel data by interpolation of texel data from two of said first-level clip map and said second-level clip map.

2. The method of claim 1, further comprising generating a first texture coordinate generator for said first-level clip map.

3. The method of claim 2, wherein said generating said first texture coordinate generator further comprises using a vertex shader.

4. The method of claim 1, wherein said determining said desired level clip-map further comprises calculating the base 2 logarithm of the maximum screen-space derivative of said source texture.

5. The method of claim 4, wherein said calculating the base 2 logarithm further comprises using a fragment shader.

6. The method of claim 1, further comprising updating said first level clip-map at a first time and updating said second level clip-map at a second time.

7. The method of claim 6, wherein said updating said first level clip-map comprises storing a texture tile in said computer-readable memory.

8. The method of claim 7, wherein said texture tile represents a region adjacent to said first level clip-map in a tiled-toroidal mapping of said source texture.

9. The method of claim 1, wherein said first level clip-map comprises a fixed size toroidal map.

10. The method of claim 9, wherein said fixed size toroidal map is square.

11. The method of claim 1, further comprising a grid of spatial locations indicating a level at which a valid texture tile is currently available.

12. The method of claim 1, wherein said first-level clip-map and said second-level clip map further comprise wavelet compressed texture images.

* * * * *